D. EVANGELIST.
SAFETY DEVICE FOR ELEVATORS.
APPLICATION FILED JAN. 13, 1919.

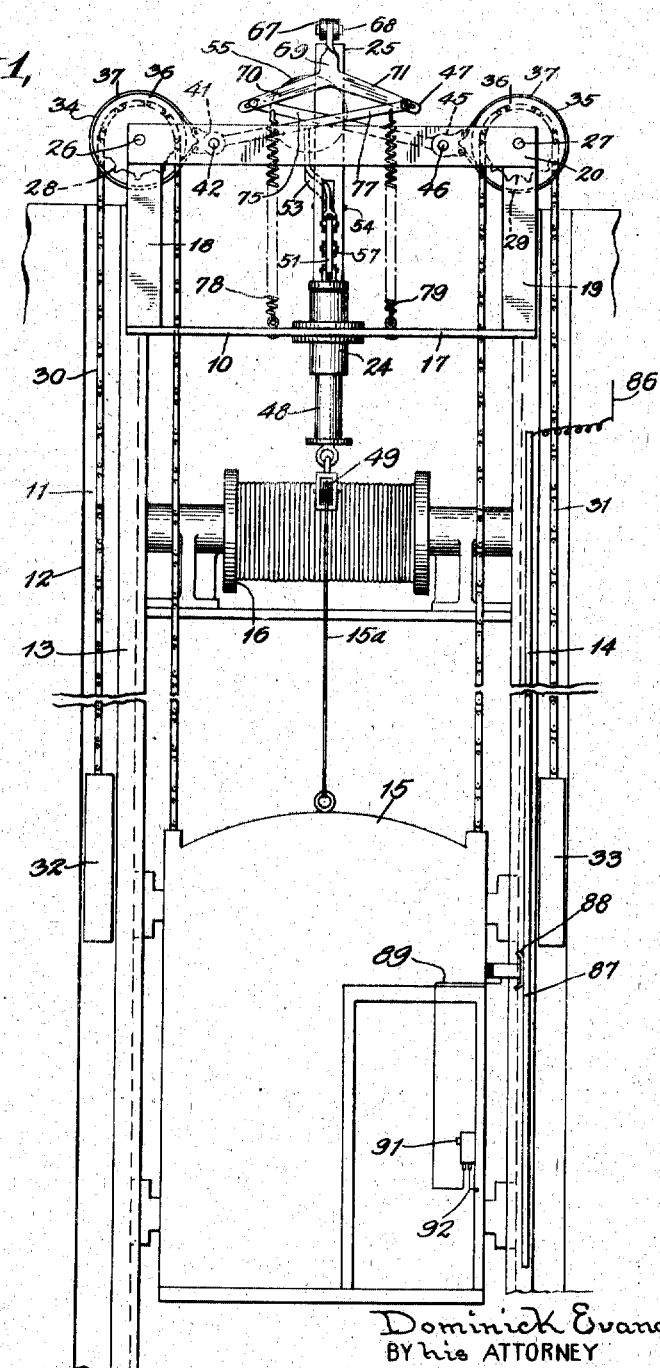

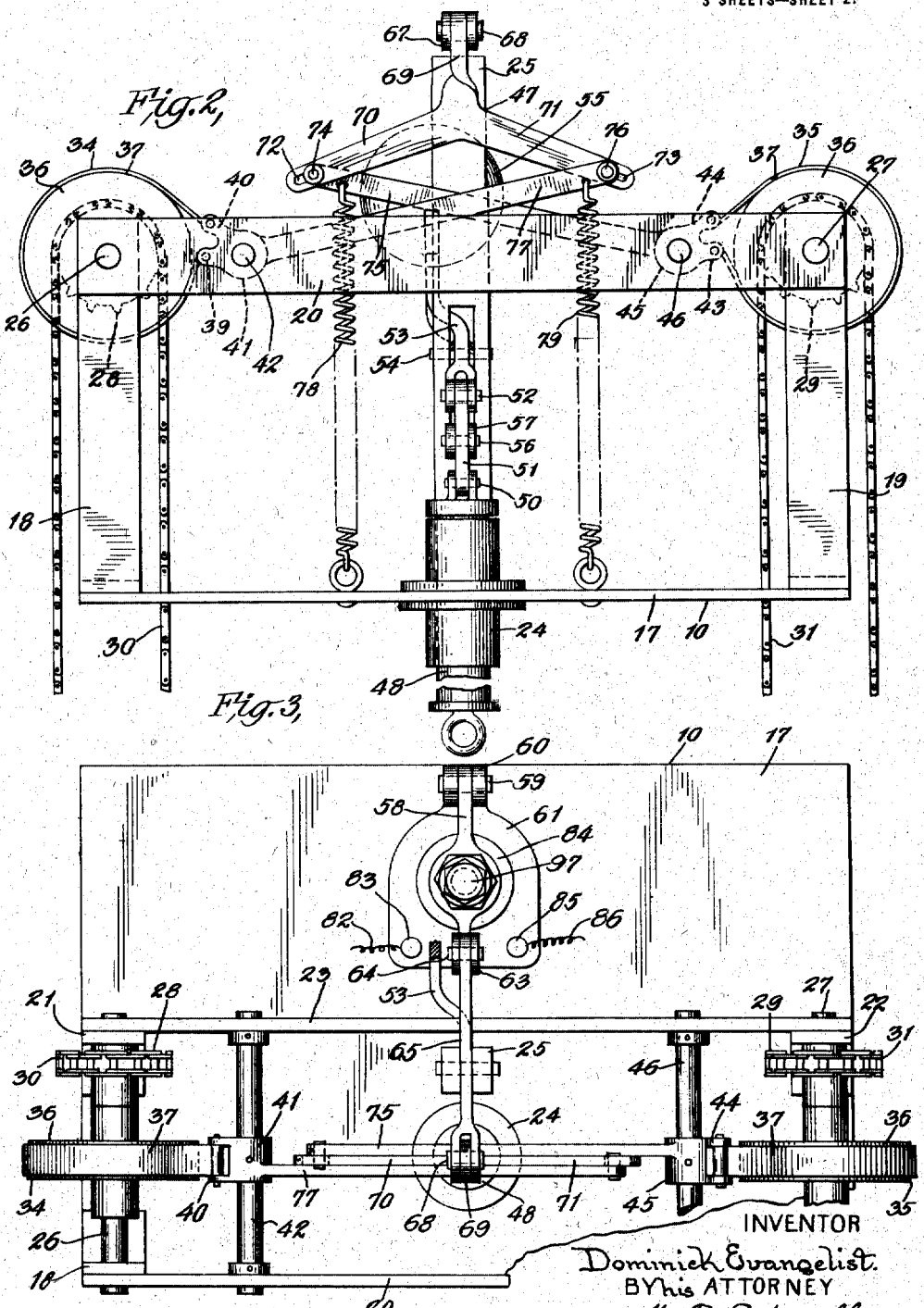

1,301,924.

Patented Apr. 29, 1919.
3 SHEETS—SHEET 3.

INVENTOR
Dominick Evangelist
BY his ATTORNEY
W. T. Criswell.

UNITED STATES PATENT OFFICE.

DOMINICK EVANGELIST, OF NEW YORK, N. Y., ASSIGNOR OF ONE-HALF TO THOMAS COSTANZO, OF NEW YORK, N. Y.

SAFETY DEVICE FOR ELEVATORS.

1,301,924.  Specification of Letters Patent.  Patented Apr. 29, 1919.

Application filed January 13, 1919. Serial No. 270,890.

*To all whom it may concern:*

Be it known that I, DOMINICK EVANGELIST, a citizen of the United States, and a resident of New York, in the county of New York and State of New York, have invented a certain new and useful Improvement in Safety Devices for Elevators, of which the following is a full, clear, and exact specification.

This invention relates to a class of devices adapted to be used in conjunction with elevators.

My invention has for its object primarily to provide a safety device designed to be applied to an elevator for serving to cause the car to stop during its travel in event of breakage of the cable so as to obviate the danger of injury to persons in the car at the time of occurrence of the accident. This is accomplished mainly by providing a frame in the upper part of the shaft well above the car of an elevator, and journaled in the frame are two shafts. On each of the shafts is held a sprocket wheel carrying a sprocket chain, and one of the ends of both sprocket chains are attached to the car, while on the second ends of the sprocket chains are weights which serve to counterbalance the weight of the car in the manner common to the operation of many types of passenger elevators. On each of the shafts is a brake which preferably includes a friction disk or wheel, and the disks are held to the shafts so as to revolve with the rotation of the shafts which are driven by the movements of the weights and sprocket chains causing the sprocket wheels to rotate. On the periphery of each of the disks is a strap, and associated with the cable of the car is a mechanism which is operable in event of the cable being accidentally separated from the car to cause the straps to frictionally engage the disks for checking the rotation of the disks, shafts and sprocket wheels whereby the sprocket chains will be held to cause stopping of the movement of the car, in order to prevent the car from falling a dangerous distance.

Another object of the invention is to provide an electrically operable controller whereby the mechanism may be operated to release the brakes for allowing the weights of the sprocket chains to operate for causing the chains to move so that the car will travel a desired distance to a landing should the car be stopped between landings at the time of separation of the cable; and still a further object of the invention is to provide a simple, efficient and durable safety device adapted to be made for effectual use in conjunction with elevators of different sizes.

With these and other objects in view the invention will be hereinafter more particularly described with reference to the accompanying drawings forming a part of this specification in which similar characters of reference indicate corresponding parts in all the views, and will then be pointed out in the claims at the end of the description.

In the drawings, Figure 1 is a fragmentary view showing an elevation of an elevator with one form of safety device embodying my invention applied thereto.

Fig. 2 is an enlarged fragmentary view, partly broken away, showing a front elevation of the safety device.

Fig. 3 is an enlarged fragmentary view, showing a top plan of the device with one of its weights removed therefrom.

Figure 4:
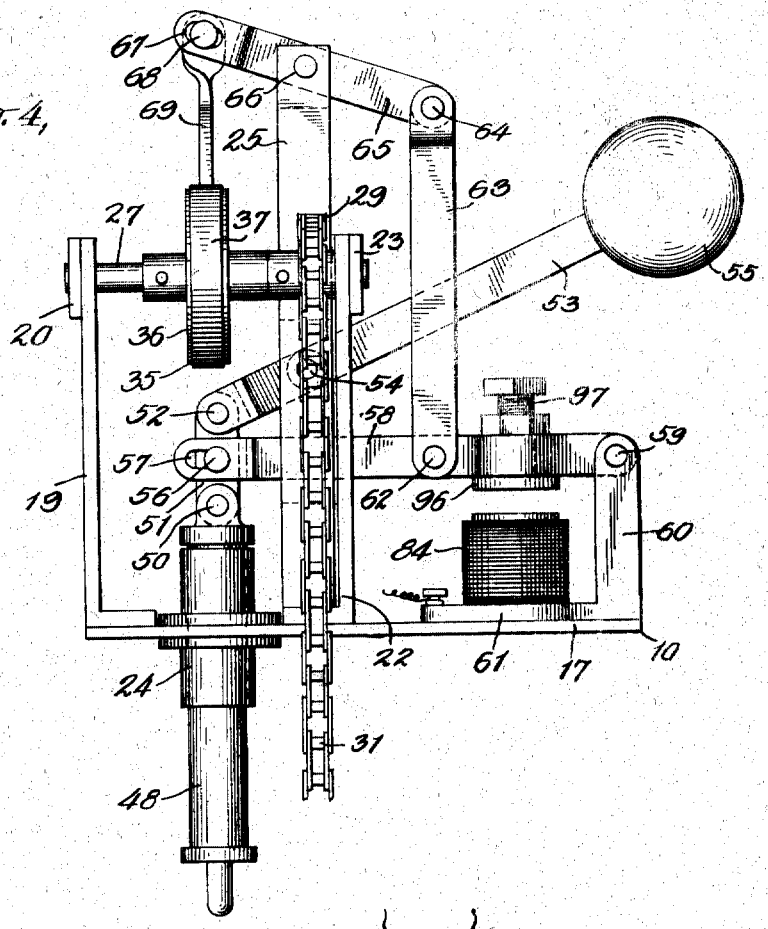
Fig. 4 is an enlarged side elevation, partly fragmentary of the device.
Figure 5:
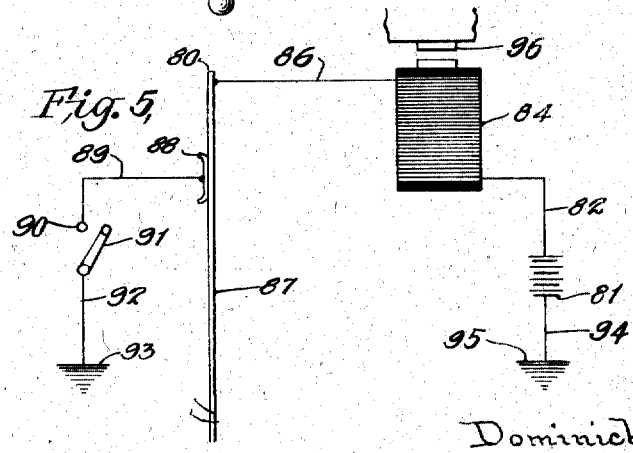
Fig. 5 is a diagrammatic view of the electric circuit and associate parts of the controller employed in conjunction with the device.

The safety device has a frame 10 which is made of a size to be freely accommodated as well as being mounted in the upper part of the shaft well 11 of an elevator, as 12, having the usual guide rails, as 13 and 14, between which the elevator car, as 15, is caused to travel in the well upwardly and downwardly by one or more cables, as 15$^a$, being attached to the roof of the car and then wrapped on a drum, as 16, which may be driven by any suitable power propelling means for operating the cable and car in the well known manner. The frame 10 has a base plate 17 which is preferably substantially rectangular, and the frame is mounted in the shaft well so that the front part of the base plate is directly above the car of the elevator. Projecting upwardly from the front corners of the base plate 17 are two standards 18 and 19, and the upper ends of these standards are connected by a cross rail 20. Extending upwardly from the central parts of the ends of the base plate are two other standards 21 and 22 having their upper ends also connected by a cross rail 23. In the center part of the base plate and above the cable 15 of the elevator is an opening in which is held a bearing 24 the passage through which is on a vertical line with the cable, and projecting upwardly from the base plate between the bearing 24 and cross rail 23 is a post 25 which extends some distance above the cross rails.

In the standards 18 and 21 as well as in the cross rails 20 and 23 is journaled a shaft 26, and in the standards 19 and 22 as well as in the cross rails 20 and 23 is journaled another shaft 27. On the shaft 26 adjacent to the cross rail 23 is held a sprocket wheel 28, and on the shaft 27 also adjacent to the cross rail 23 is held a second sprocket wheel 29. A sprocket chain 30 is carried on the sprocket wheel 28, and one end of this chain is secured to the top of the car of the elevator, while on the sprocket wheel 29 is carried a sprocket chain 31 having one of its ends also fastened to the top of the car. Both of the sprocket chains are of lengths so that their second ends extend from the sprocket wheels downwardly in the shaft well 11 of the elevator, and on the second ends of the sprocket chains are provided suitable weights, as 32 and 33, adapted to counterbalance in the usual manner the weight of the car. By providing the sprocket wheels 28 and 29, the sprocket chains 30 and 31 with the weights 32 and 33 in this fashion these parts will operate with the travel of the car, and in turn the shafts 26 and 27 will be revolved by the rotation of the sprocket wheels. Furthermore, in event of the car being separated from its cable, and by stopping the rotation of the shafts and sprocket wheels the movements of the sprocket chains 30 and 31 with the weights will likewise be stopped. The travel of the car will then be checked, and to check the rotation of the shafts 26 and 27 two brakes, as 34 and 35 are provided.

The brakes 34 and 35 may be of any suitable types, though I preferably employ forms of the brakes each of which includes a disk or wheel 36. The disks are held respectively on the central part of each of the shafts 26 and 27, and on the periphery of each of the disks is a friction strap 37. Both of these straps are arranged on the disks so that their ends protrude toward each other as well as being disposed toward the post 25 of the frame 10. The ends of the strap 37 of the brake 34 are pivotally attached to the ends of two spaced lugs or fingers, as 39 and 40, which protrude from a sleeve or knuckle 41 revoluble on a shaft or rod 42 arranged between the cross rails 20 and 23 of the frame 10 and the ends of the strap 37 of the brake 35 are pivotally attached to the ends of two spaced lugs or fingers 43 and 44 projected from a sleeve or knuckle 45 which is rotatable on a shaft or rod 46 held also between the cross rails 20 and 23. The strap 38 and the knuckles 41 and 45 are so proportioned, besides being arranged so that when the spaced lugs are swung upwardly the straps will tighten on the disks 36 of the brakes to frictionally prevent the rotation of the disks, and in turn the operation of the shafts 26 and 27, sprocket wheels 28 and 29, and sprocket chains 30 and 31 will be stopped. The movements of the weights 32 and 33 will also be stopped for checking the travel of the car, the brakes being so proportioned with respect to the weight of the car that their functioning will cause the car to stop within a reasonable and safe distance. In order to operate the brakes 34 and 35 to check the car should the cable 15$^a$ be accidentally severed, a mechanism, as 47, is provided.

The mechanism 47 consists preferably of a shaft 48 which is reciprocable in the bearing 24 of the frame 10, and on the lower end of this shaft is provided a pullley 49 over which the cable 15$^a$ is movable, the pulley being arranged at a suitable position between the car and the cable drum 16. To the upper end of the shaft 48 is pivoted, at 50, the lower end of a link 51, and to the upper end of the link is pivoted, at 52, one end of a lever or bar 53 having a part intermediate its ends fulcrumed, at 54, to the central part of the post 25 of the frame 10, and on the second end of the bar is a ball or weight 55. The bar 53 may be movably disposed through an opening in the post 25 so that the bar and the weight 55 will be disposed above the rear part of the base plate 17 of the frame of the device. The weight 55 is sufficient to cause the link 51 and shaft 48 to properly support the cable 15$^a$ during its movements, and the weight is also sufficiently heavy so that the strain on the cable will cause the bar 53 and the weight to be normally held on an upward incline above the base plate of the frame, as shown in Fig. 4. To a pin 56 provided on the central part of the link 51 is slidably pivoted the slotted bifurcated end 57 of a bar 58 which extends rightangularly from the link to the rear edge of the base plate 17 of the frame, and the second end of the bar 58 is pivoted, at 59, to the pronged upper end of an upwardly extending arm 60 of a bracket 61 which is provided on the base plate of the frame at its rear edge. To the central part of the bar 58 is pivoted, at 62, the pronged lower end of a vertically disposed bar 63 having a bifurcated upper end which is pivoted, at 64, to a rocking lever 65 having its central part fulcrumed, at 66, to the upper end of the post 25 of the frame so that the second end of the rocking lever terminates on approximately a vertical line with relation to the pivoted end of the bar 53 of the weight 55. The vertical bar 63 is of a length so that the rocking lever is disposed on an upward incline with respect to the upper end of the bar 63, and the second end of the rocking lever terminates with a slotted bifurcated end 67. To this bifurcated end of the lever 65 is slidably pivoted, at 68, the upper end of a short bar 69 depending downward from the lever, and on the lower end of the bar 69 are two diverging downwardly disposed arms 70 and 71 which protrude toward the knuckles 41 and 45. The free end of the arm 70 is slotted, at 72, and the free end of the arm 71 is slotted, at 73. Slidably pivoted, at 74, to the slotted end of the arm 70 is one end of a rod or bar 75 having the knuckle 45 formed on its other end, and to the slotted end of the arm 71 is slidably pivoted, at 76, one end of another rod or bar 77 having its second end formed on the knuckle 41 so that the rods are relatively disposed across each other in somewhat the fashion of a lazy tong, and the arms 70 and 71 of the bar 69 are disposed between these rods. The knuckles 41 and 45 are provided on the rods 75 and 77 so that when the rods are moved in downward directions the knuckles will be rotated on their shaft for causing the fingers of the knuckles to be swung in upward directions and also from the disks 36 of the brakes 34 and 35 so that the straps 37 of the brakes will frictionally engage the disks, and when the rods are moved upwardly the knuckles will be reversely swung to free the frictional engagement of the straps with the disks. Serving to force the rods 75 and 77 in downwardly directions for causing the knuckles 41 and 45 to be normally positioned so that the straps of the brakes are out of frictional engagement with the disks of the brakes, to the rod 75 in proximity to its pivot 74 is held the upper end of a spring, as 78, having its lower end held to the base plate 17 of the frame 10, and to the rod 77 adjacent to its pivot 76 is held the upper end of a spring, as 79, having its lower end also held to the base plate of the frame.

Should the cable 15ª accidentally be severed from the elevator car the mechanism 47 will operate to prevent the car from falling by the weight 55 being lowered when the strain of the cable by its breakage relieves the load upon the shaft 48. With the lowering of the weight the pivoted end of its bar 53 with the link 51, shaft 48 and the slotted end 57 of the bar 58 will be moved upwardly. The vertical bar 63 will likewise be guided in an upward direction, and the rocking lever 65 will be moved so that its slotted end 67 will be swung downwardly. The arms 70 and 71 of the short bar 69 will likewise be moved downwardly, and the rods 75 and 77 will be forced in similar directions, the tension of the springs 78 and 79 also tending to assist in causing these rods to move in downward directions. The knuckles 41 and 45 will then be swung on the shafts 42 and 46 so that their fingers will be swung upwardly as well as in a direction away from the disks 36 of the brakes 34 and 35. The straps 37 will thereby be brought into frictional engagement with the disks which in turn will cease to revolve for stopping the rotation of the shafts 26 and 27. The rotation of the sprocket wheels 28 and 29 will also be stopped, and the movements of the sprocket chains 30 and 31 with the weights 32 and 33 will be checked for holding the car of the elevator to prevent it from falling in the elevator shaft.

To allow the car to be moved to a suitable landing or exit of the elevator in event of the car being stopped between the landings, a controller, as 80, is provided. The controller preferably consists of an electric circuit which may lead from any suitable source of electricity supply, such as from a battery, as 81. From one terminal of the battery is a wire 82 leading to the binding post 83 which is wired to a magnet 84 provided on the bracket 61 of the base plate 17 of the frame of the device under the bar 58 of the mechanism 47. The magnet is also wired to a second binding post 85 provided on the bracket 61, and from this binding post is a wire 86 which may lead to a metallic rail 87 which is insulated and held in the elevator shaft well. In movable contact with the rail 87 is a shoe, as 88, which is provided on as well as being insulated from the elevator car 15, and from this shoe is a wire 89 leading to a contact 90 adapted to be engaged by a normally open switch 91 which may be of a well known push button type arranged at a convenient part interiorly of the elevator car. To the switch is connected one end of a wire 92 leading to ground, as 93, which may be a suitable part of the elevator car, and to the second terminal of the battery is connected a wire 94 also leading to ground, as 95, which may be at another suitable part of the elevator. In the bar 58 of the mechanism 47 is an armature 96 which may be adjusted toward and from the core of the magnet by means of a set screw, as 97. The magnet is wound so that when energized the armature 96 will be attracted into engagement with the magnet for causing the mechanism 47 to be operated. When it is desired to cause the car 15 to be moved a given distance following being stopped by the mechanism 47, as above explained, the switch 91 is moved into engagement with the contact 90. The circuit will then be closed from one terminal of the battery 81 over wire 82 through the binding post 83 to and through the magnet 84, over wire 86, over the rail 87, through the shoe 88, over the wire 89, through the switch 91 and over the wire 92 to ground. From the second terminal of the battery the circuit will be closed over the wire 94 also to ground, and the magnet thereby being energized the armature 96 will be attracted to its core. With this movement of the armature the bars 58 and 63 will be swung downwardly, and the rocking lever 65 will be swung to cause the rods 75 and 77 to move for swinging the knuckles 41 and 45 to release the straps 37 from their engagement with the disks 63 of the brakes 34 and 35. The weights 32 and 33 will then cause the sprocket chains 30 and 31 to be moved for rotating the sprocket wheels 28, 29 and the shafts 26, 27, and the car of the elevator will be accordingly moved a suitable distance to a landing to allow the occupants of the car to depart therefrom. With the opening of the switch to cut-off the current the armature 96 will be released from the magnet to allow the weight to operate for operating the mechanism 47 to again operate the brakes 34 and 35 for bringing the car to a standstill. Thus a very simple and efficient safety device is provided for preventing the car of an elevator from dangerously falling should the cable of the car be accidentally severed from the car.

In the foregoing description, I have embodied the preferred form of my invention, but I do not wish to be understood as limiting myself thereto, as I am aware that modifications may be made therein without departing from the principle or sacrificing any of the advantages of this invention, therefore I reserve to myself the right to make such changes as fairly fall within the scope thereof.

Having thus described my invention, I claim as new and desire to secure by Letters Patent:—

1. The combination of a frame mounted in the upper part of the shaft over the car of the elevator, two spaced shafts journaled in the frame, two sprocket wheels one fixed on each shaft, two sprocket chains on each sprocket wheel and one of the ends of the chains being held to the car of the elevator so that the chains will move with the travel of the car to rotate the sprocket wheels and the shafts, two weights one on the second end of each chain to counterbalance the car, two brakes one on each of said shafts, mechanism on the frame, associated with the cable of the car, said mechanism being operable with the separation of the cable from the car to cause the brakes to operate whereby the rotation of the shafts and sprocket wheels will be checked to stop the travel of the car by stopping the movement of the sprocket chains and their weights, a normally open electric circuit, a magnet interposed in the circuit and associated with the mechanism, and a switch in the car also interposed in the circuit, said switch being operable to close the circuit to energize the magnet for causing the mechanism to be reversely operated whereby the brakes will be released to allow the weights to move the car.

2. The combination of a frame mounted in the upper part of the shaft over the car of the elevator, two spaced shafts journaled in the frame, two sprocket wheels one fixed on each shaft, two sprocket chains one on each sprocket wheel and one of the ends of the chains being held to the car of the elevator so that the chains will move with the travel of the car to rotate the sprocket wheels and the shafts, two weights one on the second end of each chain to counterbalance the car, two brakes one on each of said shafts, an upwardly and downwardly movable weight, mechanism on the frame, associated with the cable of the car, said mechanism being operable by the lowering of the weight with the separation of the cable from the car to cause the brakes to operate whereby the rotation of the shafts and sprocket wheels will be checked to stop the travel of the car by stopping the movement of the sprocket chains and their weights, a normally open electric circuit, a magnet interposed in the circuit and associated with the mechanism, and a switch in the car also interposed in the circuit, said switch being operable to close the circuit to energize the magnet for causing the mechanism to be reversely operated whereby the brakes will be released to allow the weights to move the car.

3. The combination of a frame mounted in the upper part of the shaft over the car of the elevator, two spaced shafts journaled in the frame, two sprocket wheels one fixed on each shaft, two sprocket chains one on each sprocket wheel and one of the ends of the chains being held to the car of the elevator so that the chains will move with the travel of the car to rotate the sprocket wheels and the shafts, two weights one on the second end of each chain to counterbalance the car, two disks one on each of said shafts and both being rotatable with the rotation of the shafts, two friction straps one on the periphery of each disk, mechanism on the frame, associated with the cable of the car, said mechanism being operable with the separation of the cable from the car to cause the straps to frictionally engage the disks whereby the rotation of the disks, shafts and sprocket wheels will be checked to stop the travel of the car by stopping the movement of the sprocket chains and their weights, a normally open electric circuit, a magnet interposed in the circuit and associated with the mechanism, and a switch in the car also interposed in the circuit, said switch being operable to close the circuit to energize the magnet for causing the mechanism to be reversely operated whereby the brakes will be released to allow the weights to move the car.

4. The combination of a frame mounted in the upper part of the shaft over the car of the elevator, two spaced shafts journaled in the frame, two sprocket wheels one fixed on each shaft, two sprocket chains one on each sprocket wheel and one of the ends of the chains being held to the car of the elevator so that the chains will move with the travel of the car to rotate the sprocket wheels and the shafts, two weights one on the second end of each chain to counterbalance the car, two brakes one on each of said shafts, a rocking lever on the frame, means associated with the brakes and with one end of the lever to cause the brakes to operate when the lever is rocked, means associated with the second end of the lever and with the cable of the car so that with the separation of the cable from the car said means will operate to cause the lever to rock for operating the brake operative means as well as operating the brakes to stop the travel of the car by stopping the movement of the sprocket chains and their weights, a normally open electric circuit, a magnet interposed in the circuit and associated with the means for operating the second end of the rocking lever, and a switch in the car also interposed in the circuit, said switch being operable to close the circuit to energize the magnet for causing the lever to be reversely rocked whereby the brakes will be released to allow the weights to move the car.

5. The combination of a frame mounted in the upper part of the shaft over the car of the elevator, two movable weights counterbalancing the car, two brakes on the frame, means associated with the brakes and with the weights to stop the movements of the weights for checking the car, mechanism on the frame, associated with the cable of the car, said mechanism being operable with the separation of the cable from the car to cause the brakes and said means to operate whereby the travel of the car will be stopped by stopping the movements of the weights, a normally open electric circuit, a magnet interposed in the circuit and associated with the mechanism, and a switch in the car also interposed in the circuit, said switch being operable to close the circuit to energize the magnet for causing the mechanism to be reversely operated whereby the brakes will be released to allow the weights to move the car.

6. The combination of a frame adapted to be mounted in the upper part of the shaft over the car of the elevator, two movable weights counterbalancing the car, two brakes on the frame associated with the weights, mechanism on the frame, associated with the cable of the car, said mechanism being operable with the separation of the cable from the car to cause the brakes to operate whereby the travel of the car will be stopped by stopping the movements of the weights, a normally open electric circuit, a magnet interposed in the circuit and associated with the mechanism, and a switch in the car also interposed in the circuit, said switch being operable to close the circuit to energize the magnet for causing the mechanism to be reversely operated whereby the brakes will be released to allow the weights to move the car.

This specification signed and witnessed this 11th day of January A. D. 1919.

DOMINICK EVANGELIST.

Witnesses:
J. FREDERICK CRYER,
K. KOEPER.

Copies of this patent may be obtained for five cents each, by addressing the "Commissioner of Patents, Washington, D. C."